Figure 1:
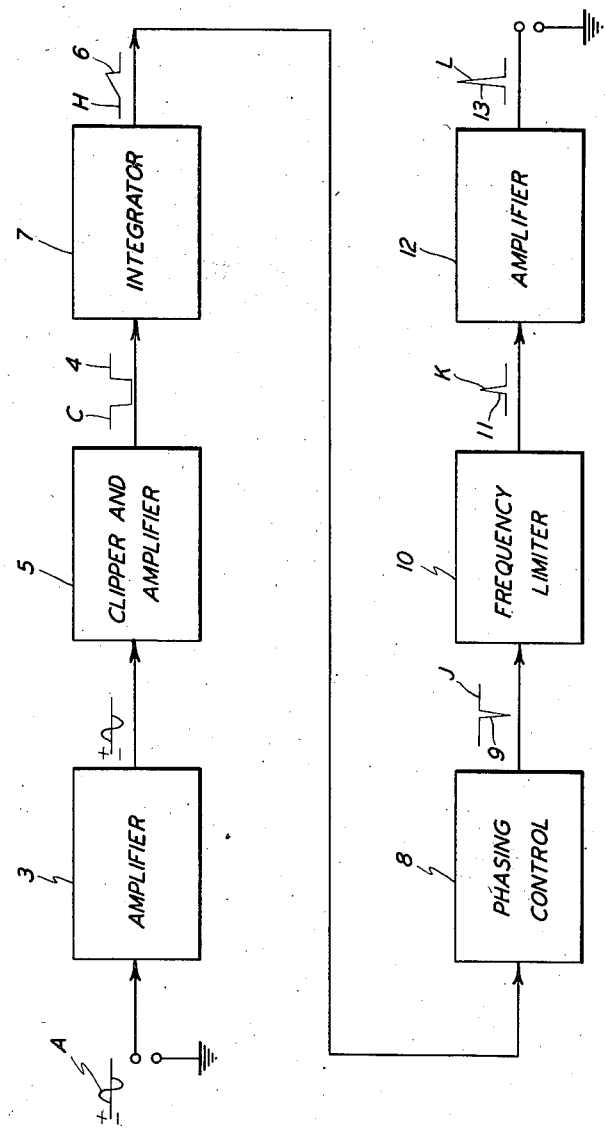

Aug. 6, 1957     A. Q. HISLOP ET AL     2,802,145
STROBOSCOPIC DEVICE
Filed March 11, 1954     4 Sheets-Sheet 1

INVENTORS
ARTHUR Q. HISLOP
WILLIAM Q. LEYSATH
BY
*Lockwood, Galt, Woodard, & Smith*
ATTORNEYS

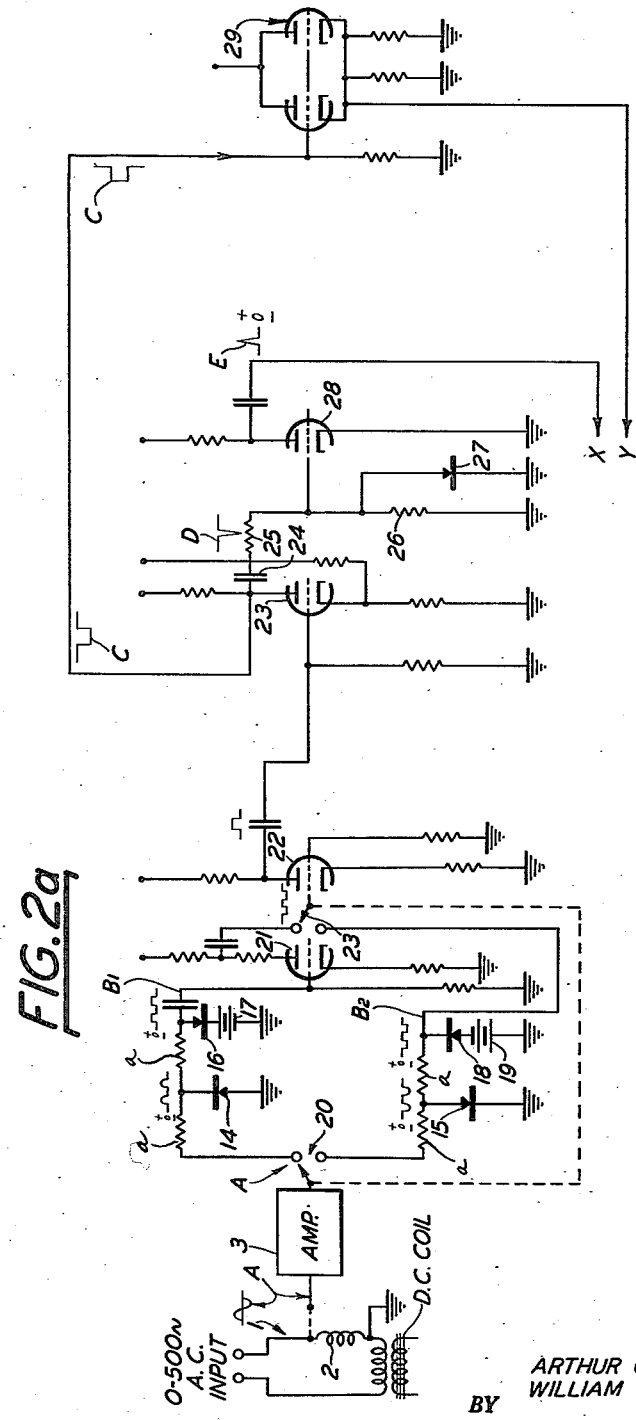

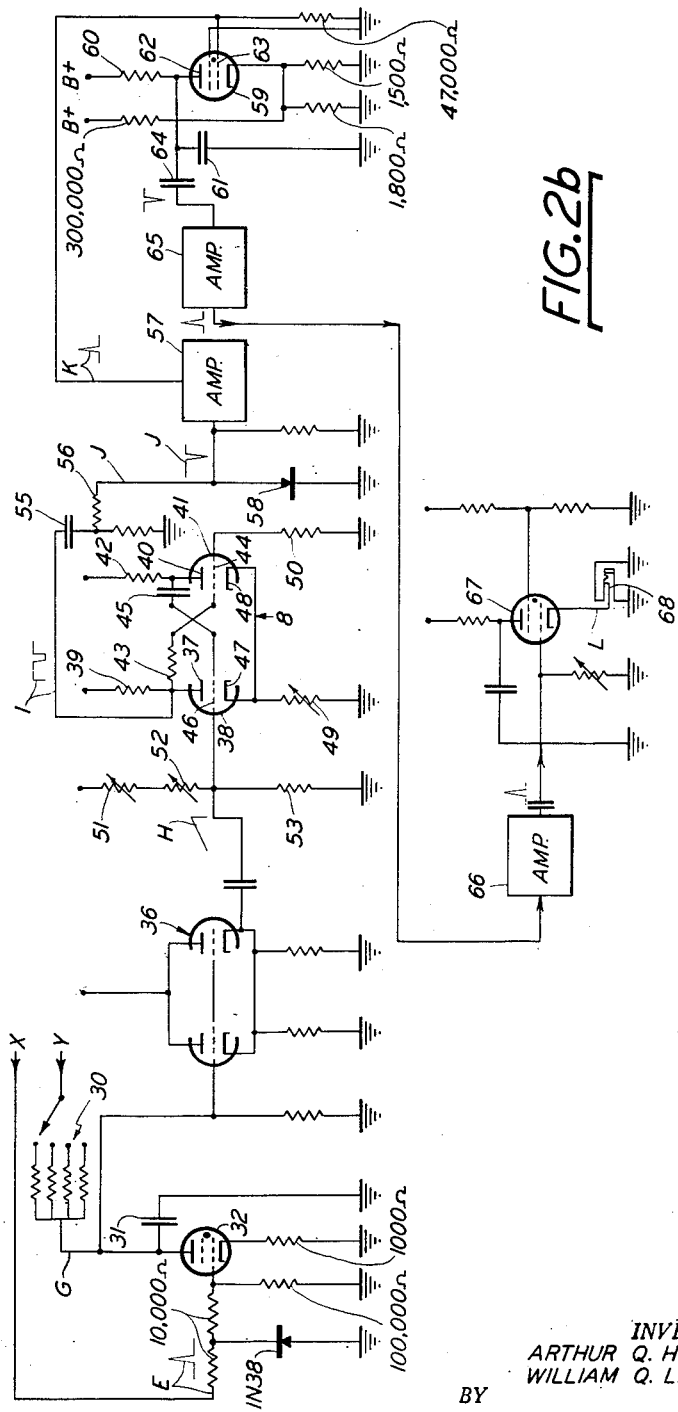

United States Patent Office
2,802,145
Patented Aug. 6, 1957

2,802,145

STROBOSCOPIC DEVICE

Arthur Q. Hislop, Antwerp, Ohio, and William Q. Leysath, Fort Wayne, Ind., assignors to International Telephone and Telegraph Corporation Application March 11, 1954, Serial No. 415,642

13 Claims. (Cl. 315—163)

The present invention relates to a stroboscopic device intended for use in studying the successive phases of periodic mechanical motion by means of periodically pulsed light.

The usual instruments for studying the successive phases of a periodic mechanical motion by means of flashing light are generally limited in use to the condition of stable, constant frequency mechanical motion. That is to say, the mechanical motion is caused to occur at a selected fixed frequency whereupon the stroboscopic device is adjusted to correspond to this frequency. This method of motion study is tedious and time consuming when it is desired to observe motion contained in a range of different frequencies, since the stroboscope must be separately adjusted for each change in frequency of the mechanical motion. For example, if it is desired to make a motion study through the range of from zero to five hundred (500) cycles per second, the mechanical vibration is observed in successively adjusted steps of fixed frequency of for example, ten (10) cycles and conditions of motion which normally occur between these steps of ten cycles are not observed. In testing certain types of equipment, such as electronic equipment, for ruggedness in withstanding vibration, it often times occurs that the frequency of vibration which causes destruction of the equipment is quite sharply defined and is such as may be missed with rapidly changing vibration frequencies.

It is, therefore, an object of this invention to provide a stroboscopic device which overcomes the deficiencies of the prior art instruments.

It is another object of this invention to provide a stroboscopic device which will enable continuous observance throughout a given testing range while the frequency of mechanical motion is being continuously varied.

It is still another object of this invention to provide a stroboscopic instrument which is synchronized with the motion of a vibrating device regardless of the frequency of vibration.

It is still another object of this invention to provide a stroboscopic instrument which is synchronized with the motion of the vibrating device and which is insensitive to changes in acceleration of said device while the frequency of vibration is held constant.

It is still a further object to provide a synchronous stroboscopic instrument which is adjustable to examine a moving body at any portion of its movement cycle, the instrument remaining continuously in synchronism with the movement of such body.

In accordance with the principles of this invention, a stroboscopic instrument is provided which comprises first means for providing a signal corresponding to a mechanical vibration condition, and means sensitive to this signal for providing light flashes in synchronism therewith, such light flashes thereby being synchronized with the movement of the vibrating body irrespective of the latter's frequency of vibration.

For a better understanding of this invention together with other and further objects thereof, reference is made to the accompanying drawings taken in connection with the following description, the invention being defined by the appended claims.

In the drawings:

Fig. 1 is a block diagram of one embodiment of this invention;

Figs. 2a and 2b constitute a complete circuit diagram; and

Figure 3:
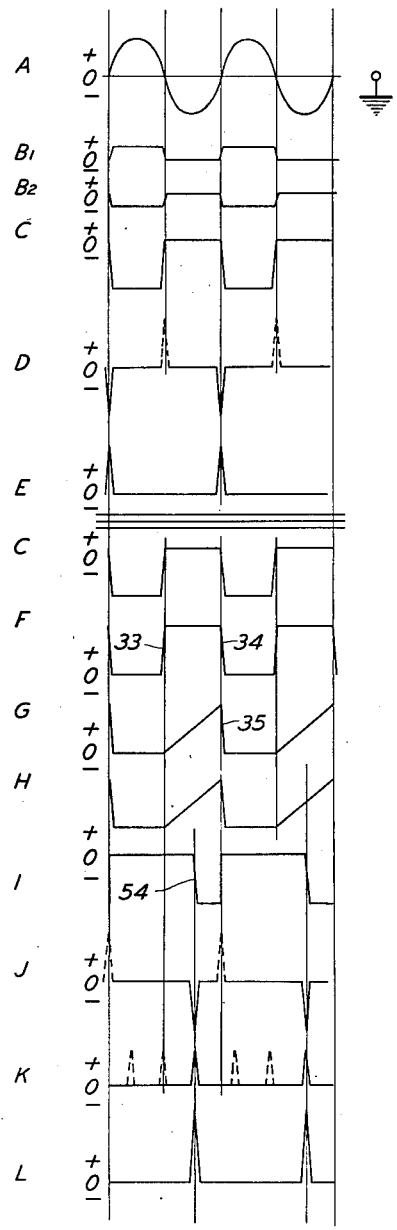

Fig. 3 illustrates representative waveforms used in explaining the operation of the invention.

It is conventional in the art to utilize what are commonly characterized as "shake tables" upon which a piece of electronic equipment or the like may be mounted and vibrated at a known frequency. What happens to the piece of equipment during vibration is observed by means of a conventional stroboscope which usually is adjustable in frequency so as to synchronize the flashing of the stroboscopic light with the frequency of equipment vibration. One design of "shake table" is actuated by alternating current power which is variable in frequency over a suitable range of frequencies, such as twenty to five hundred (500) cycles per second. Such a conventional device is indicated generally by the reference numeral 1 in Fig. 2a. Since the frequency of table vibration is directly related to the frequency of this alternating current power, such vibration frequency may be sampled by inserting a small inductor 2 (Fig. 2) in series with the power line.

This sampled signal is first amplified by an amplifier 3 (Fig. 1) and then shaped into a low amplitude square wave pulse 4 by means of suitable clipping and amplifying circuitry indicated by reference numeral 5. This square wave pulse 4 is next formed into a saw-tooth wave 6 by means of an integrating circuit 7. A phasing control circuit 8, which is normally nonconductive, is fired by the saw-tooth wave 6 to produce a single, sharp pulse 9 which is suitably limited as to repetition rate by the frequency limiter 10 so as to appear as pulses 11 directly related repetitively with the sine wave A fed to the amplifier 3. The pulses 11 are then amplified by the amplifier 12 to provide output pulses 13 of high energy content which are used to fire the usual stroboscopic lamp.

As will be explained more fully hereinafter, the occurrence of the pulse 9, while being maintained in exact frequency synchronism with the sine wave sample taken from the "shake-table," is adjustable in phase so as to vary the flashing signal 13 to any selected point in any of the vibration cycle of the "shake-table." Referring to Fig. 2a, the clipping and amplifying circuits 5 are comprised of suitable rectifiers 14 and 15 which are connected into independent branch circuits in opposite polarity such that the branch containing the rectifier 14 will remove the negative lobes of the sine wave A and the branch circuit of rectifier 15 will remove the positive lobes thereof.

Considering the branch circuit containing the rectifier 14 first, the rectifier wave of positive polarity is fed to a clipping diode 16 which is biased by means of a battery 17. The diode 16 is so arranged in the circuit that without any bias, the positive lobes of the rectified wave will be directly shorted to ground, but since it is biased, only the peak portion thereof will be clipped thereby leaving the wave form indicated by the graph B1 of Fig. 3.

The branch circuit containing diode rectifier 15 includes a similar clipping circuit 18 and 19 which performs the same function on the negative lobes of the rectified wave so as to produce a wave form as illustrated by graph B2. A single pole double throw switch 20 connects the amplified sine wave A of amplifier 3 to a selected one of these branch circuits.

The purpose of these two branch circuits is to provide proper synchronism between the selected half cycle of the vibratory motion of the "shake-table" which is to be studied. For example, the branch circuit containing diode 14 may provide a study of the upper half-cycle of vibratory motion and the branch circuit containing diode 15 the lower half cycle.

The wave B1 being in positive polarity is inverted by a conventional amplifying circuit 21 whereas the wave B2, already being inverted into the proper polarity, is fed directly to a conventional succeeding amplifier 22. A switch 23 which is preferably gauged with the switch 20, serves to select either the signal produced by the phase inverter 21 or the signal B2 from the branch circuit 15.

The signal produced by the amplifier 22 is next fed to a square wave amplifier 23 for producing the wave C (Fig. 3). To the plate circuit of this amplifier 23 is connected a differentiating network composed of capacitor 24 and resistance 25, these parts being connected in series and grounded through a suitable resistor 26 shunted by a diode conductor 27. The differentiating circuit produces two sharp pulses as indicated by the graph D of Fig. 3, and the diode 27 serves to short the positive pulses (in dashed lines) to ground thereby leaving only the negative pulses which are fed to the control grid of amplifier 28. This amplifier 28 produces the pulses shown in graph E which serve a purpose to be explained more fully hereafter.

The amplified square wave C, as derived from the plate of the amplifier 23, is coupled into the grid circuit of a conventional cathode follower 29 which provides across the cathode resistors thereof a signal corresponding to graph F (Fig. 3). It is important to note that while the wave form C which is fed to the grid circuit of the cathode follower 29 is of negative polarity, the wave form F derived from this cathode follower 29 may be regarded for clear understanding as having a positive polarity.

The wave F is next fed to an integrating circuit (Fig. 2b) comprised of a suitable resistor 30 and a capacitor 31, the resultant wave of this integrating circuit being applied to the plate of a conventional thyratron tube 32. The wave E as derived from the amplifier 28 is fed over line "x" to the grid of the thyratron 32 and controls the firing of the latter. Thus, with the application of the square wave F to the integrating circuit 30, 31, the condenser 31 will charge progressively to a point as indicated by the graph G of Fig. 3. The start of this charging time occurs simultaneously with the leading edge 33 (Fig. 3) of the wave F, and the charge progressively increases substantially linearly until such time as the positive pulse E, which is in synchronism with the trailing edge 34 of the wave F, fires the thyratron 32. Simultaneously with the firing of this tube, the charge on the condenser 31 is sharply reduced thereby providing the trailing edge 35 of the saw-tooth wave G.

This wave G is coupled to a cathode follower 36 which provides a substantially identical wave form H which is coupled to the phasing control circuit 8.

Considering for the moment only the phasing control circuit 8 itself, this circuit corresponds to a slight degree only to the usual Eccles-Jordan trigger circuit. However, the operation of this phasing control circuit 8 is substantially different. To the anode 37 of the first tube 38 is connected the usual plate voltage supply resistor 39. The plate 40 of the second triode 41 is supplied with voltage through a voltage supply resistor 42. A resistor 43 is connected between the plate 37 of tube 38 and the grid 44 of tube 41. A condenser 45 connects the plate 40 of tube 41 to the grid 46 of the tube 38. The cathodes 47 and 48 of both tubes are joined to a common cathode resistor 49.

A resistor 50 of suitable size is connected between the grid 44 of tube 41 and ground whereupon the resistors 39, 43 and 50 constitute a voltage divider providing a bias voltage for the control grid 44 which renders tube 41 normally conductive. Another voltage dividing circuit is comprised of series connected resistors 51, 52 and 53 which are connected between B plus and ground with the junction between the two resistors 52 and 53 supplying a lower bias voltage to the grid 46 of tube 38. The saw-tooth wave H is also fed to this grid 46.

In operation, tube 38 is normally non-conductive while tube 41 is normally conductive. The bias voltage across the resistor 53 is so selected that when the saw-tooth wave H is added thereto, the tube 38 will be rendered conductive at some point along wave H. By adjusting the division of bias voltage on the grid 46, the tube 38 may be made to conduct at any preselected point along the leading edge of the saw-tooth wave H, and since this leading edge corresponds in time to a complete half-cycle of motion of the shake-table, it is thus seen that a convenient method of selecting any point of this motion half-cycle is available. Assuming that the tube 38 is rendered conductive when the saw-tooth wave H reaches half amplitude, the voltage appearing on the plate 37 instantaneously drops. This drop in voltage is conducted to the grid 44 of tube 41 thereby cutting the latter off which serves to provide a sudden increase in the voltage appearing on plate 40. This sudden increase in voltage is coupled by means of condenser 45 to grid 46 of the tube 38 causing the latter to conduct even more heavily. Thus, the two tubes 38 and 41 so cooperate as to provide an almost vertical wave return the moment the tube 38 starts to conduct. This steep wave return is indicated by the reference numeral 54 (Fig. 3) of the graph I. The wave form appearing at the plate 37 of the tube 38 corresponds to the graph I.

The signal I is coupled to a differentiating circuit composed of a condenser 55 and a resistor 56 which serves to produce a sharp negative pulse (Fig. 3) which is fed to a conventional amplifier 57. Since the trailing edge of the saw-tooth wave H fed to the phasing control circuit 8 will be differentiated into a positive pulse, indicated by the dashed peaks in wave J (Fig. 3) the diode 58 is connected to this differentiating circuit 55 and 56 to short these positive pulses to ground.

A signal K of positive polarity produced by the amplifier 57 is next fed to the frequency limiter 10 which is comprised of a thyratron 59 and an integrating circuit composed of resistor 60 and condenser 61 series connected between B plus and ground. The junction of these two parts is connected to the anode 62 of the thyratron 59.

Assuming a single cycle of operation, the condenser 61 will acquire a full charge over a period of time depending upon the time constant of the circuit 60, 61, which charge provides the proper plate voltage for the thyratron 59. With the application of the positive pulse K to the grid 63, the thyratron will thereupon fire.

In a suitable working embodiment of the present invention, the time constant of the integrating circuit 60, 61 is so selected that the tube 59 will not be permitted to fire more than 100 cycles per second. Thus, any pulses K which are applied to the grid 63 of the thyratron prior to the condenser 61 acquiring a full charge, the thyratron 59 will not be rendered conductive. Thus, if the frequency of the pulses J should occur at the rate of, for example, 150 cycles per second, the thyratron 59 will fire once only for every two cycles J thereby providing the feature of frequency limitation or dividing. This frequency limiting characteristic is illustrated by the dashed line impulses in graph K, these particular impulses having no affect on the thyratron 59.

The purpose of this frequency limiting feature resides in the protection of the usual flashing lamps from burn out, such burn out occurring in one type of stroboscopic lamp at a pulsing frequency greater than 100 cycles per second. Thus, the present instrument, while preventing the stroboscopic lamp from being burned out, still maintains exact flash synchronism with the vibratory motion of the "shake-table."

The output signal which is of negative polarity, is coupled from the plate 62 of the thyratron 59 through a differentiating capacitor 64 to an amplifier 65. The amplified pulse thus produced is again amplified by suitable circuitry 66 and thereafter applied to a firing amplifier 67. A suitable connecting jack 68 is coupled into the cathode circuit of this amplifier 67, this jack serving to provide a convenient detachable coupling for a stroboscopic lamp.

As will be more easily perceived by reference to the wave forms of Fig. 3, the foregoing instrument is absolutely insensitive to amplitude of vibration (by reason of the constant amplitude clipping of branch circuits 14 and 15) of the shake-table, and to the rate of acceleration thereof. However, it is sensitive to variations in frequency such that continuous adjustment throughout a range of selected vibration frequencies will serve to fire the stroboscopic lamp selectively at different points in any given half of the vibratory cycle.

If the frequency of shake-table vibration is maintained constant but the acceleration thereof is varied throughout a selected range, the stroboscopic lamp will be fired at the same point or angle in the vibration cycle thereby providing exact flashing synchronism.

If it should be desired to examine a particular point on the vibration cycle, the potentiometers 51 and 52 of the phasing control 8 are so adjusted as to vary the bias on the tube 38. This will vary the point on the saw-tooth wave H at which the phasing control circuit 8 conducts, at which time the ultimate flashing pulse is generated.

By means of the present invention, it is possible for the first time to make a detailed study of a body under vibratory motion to be made throughout a continuous range of frequencies. This achievement makes possible a detailed vibratory analysis by a single operator with accurate results being obtained.

While there has been described what is at present considered the preferred embodiment of the invention, it will be obvious to those skilled in the art that various changes and modifications may be made therein without departing from the invention, and it is, therefore, intended by the appended claims to cover all such changes and modifications as fall within the true spirit and scope of the invention.

While it will be understood that the circuit specifications of the stroboscopic device of this invention may vary according to design desiderata, the following circuit specifications are included, by way of example only, as suitable for observing vibratory motion in the range of from twenty to five hundred (500) cycles per second.

| Component | | Value |
|---|---|---|
| Diodes 14, 15, 16, 18, 27, 58 | | IN38 |
| Batteries 17 and 19 | volts | 1.5 |
| Tubes 21, 22 | | 12AT7 |
| Tubes 23, 28 | | 12AT7 |
| Condenser 24 | mfd | 0.015 |
| Resistor 25 | ohms | 20,000 |
| Resistor 26 | do | 10,000 |
| Resistor 30 | ohms | 6800 to 56,000 |
| Condenser 31 | mfd | 0.47 |
| Tubes 32 and 59 | | 2021 |
| Tubes 38, 41 | | 6072 |
| Resistors 39, 42 | ohms | 100,000 |
| Resistor 43 | megohm | 1 |
| Condenser 45 | mfd | 0.015 |
| Resistor 49 | ohms | 25,000 |
| Resistor 50 | do | 27,000 |
| Resistor 51 | megohm | 1 |
| Resistor 52 | ohms | 500,000 |
| Resistor 53 | do | 18,000 |
| Condenser 55 | mmfd | 300 |
| Resistor 56 | ohms | 22,000 |
| Resistor 60 | megohms | 2.7 |
| Condenser 61 | mfd | 0.0047 |
| Condenser 64 | mmfd | 91 |
| Resistors a | ohms | 120,000 |

What is claimed is:

1. A vibration analyzing system comprising first means for providing a signal corresponding to a mechanical vibration condition, second means operatively coupled to said first means responsive to said signal to produce a control voltage wave of constantly varying amplitude and corresponding frequency but which is insensitive to the amplitude of said signal, circuit means coupled to said second means and operative to produce a control signal in response to a predetermined change in the amplitude of said wave, and phasing means operatively coupled to said circuit means and responsive to said control signal to produce a single impulse corresponding to a particular angular displacement of said signal for utilization to indicate such angular displacement.

2. A vibration analyzing system comprising first means for providing a signal corresponding to a mechanical vibration condition, second means operatively coupled to said first means responsive to said signal to produce a saw-tooth wave of predetermined amplitude and corresponding frequency but which is insensitive to the amplitude of said signal, and phasing means operatively coupled to said second means and responsive to a particular amplitude of said wave to produce a single impulse corresponding to a particular angular displacement of said signal for utilization to indicate such angular displacement.

3. A vibration analyzing system comprising first means for producing a signal which corresponds to the mechanical motion of a vibrating body, and stroboscopic means operatively coupled to said first means and responsive to said signal to produce light flashes which occur synchronously with the movement of said vibrating body irrespective of the movement frequency, said stroboscopic means comprising a signal generating device operatively coupled to said first means for producing a control wave for each cycle of said signal, and a phasing device operatively coupled to said signal-generating device and responsive to said control wave to produce a flashing signal which corresponds to a particular point in the movement cycle of said body, said phasing device being adjustable to respond to different portions of said control wave whereby said flashing signal may be caused to occur simultaneously with any selected point in the movement cycle of said body.

4. A vibration analyzing system comprising first means for producing a signal which corresponds to the mechanical motion of a vibrating body, and stroboscopic means operatively coupled to said first means and responsive to said signal to produce light flashes which occur synchronously with the movement of said vibrating body irrespective of the movement frequency, said stroboscopic means comprising a signal generating device operatively coupled to said first means for producing a control wave for each cycle of said signal, and a phasing device operatively coupled to said signal-generating device and responsive to said control wave to produce a flashing signal which corresponds to a particular point in the movement cycle of said body, and a frequency-limiting device operatively coupled to said phasing device for producing a single flashing wave in response to a predetermined number of said flashing signals whereby the output frequency of the overall system is effectively limited to a finite maximum value regardless of the frequency of movement of said body.

5. A vibration analyzing system comprising first means for producing an alternating signal which corresponds to the mechanical motion of a vibrating body, a pulse-shaping and amplitude-limiting circuit operatively coupled to said first means and operative in response to said alternating signal to produce a wave having substantially vertical leading and trailing edges, a differentiating circuit coupled to said pulse-shaping circuit and serving to produce a sharp pulse in response to the leading edge of said wave, a saw-tooth generating circuit operatively coupled to both said pulse-shaping circuit and said differentiating circuit for producing a saw-tooth signal which is initiated by the occurrence of said edge and terminated by said pulse, and a phase control circuit operatively coupled to said saw-tooth circuit and operating to produce a steep wave front in response to a predetermined amplitude of said saw-tooth signal, said sharp wave front thereby corresponding to a particular point on the movement cycle of said body.

6. A vibration analyzing system comprising first means for producing an alternating signal which corresponds to the mechanical motion of a vibrating body, a pulse-shaping circuit operatively coupled to said first means and operative in response to said alternating signal to produce a wave having substantially vertical leading and trailing edges, a differentiating circuit coupled to said pulse-shaping circuit and serving to produce a sharp pulse in response to the leading edge of said wave, a saw-tooth generating circuit operatively coupled to both said pulse-shaping circuit and said differentiating circuit for producing a saw-tooth signal which is initiated by the occurrence of trailing edge and terminated by said pulse, and a phase control circuit operatively coupled to said saw-tooth circuit and operating to produce a steep wave front in response to a predetermined amplitude of said saw-tooth signal, said steep wave front thereby corresponding to a particular point on the movement cycle of said body.

7. A vibration analyzing system comprising first means for producing an alternating signal which corresponds to the mechanical motion of a vibrating body, a pulse-shaping circuit operatively coupled to said first means and operative in response to said alternating signal to produce a wave having substantially vertical leading and trailing edges, a differentiating circuit coupled to said pulse-shaping circuit and serving to produce a sharp pulse in response to the leading edge of said wave, a saw-tooth generating circuit operatively coupled to both said pulse-shaping circuit and said differentiating circuit for producing a saw-tooth signal which is initiated by the occurrence of said trailing edge and terminated by said pulse, and a normally non-conducting phase control circuit operatively coupled to said saw-tooth circuit which sharply conducts in response to a predetermined amplitude of said saw-tooth signal thereby producing a steep wave front corresponding to a particular point on the movement cycle of said body.

8. The system of claim 7 including a frequency-limiting circuit operatively coupled to said phase control circuit operative to produce one wave for a predetermined number of said steep wave fronts thereby limiting the operating frequency of said system to a finite value regardless of the frequency of movement of said body.

9. The system of claim 5 wherein the phase control circuit is constituted by a normally non-conductive electron discharge device which is rendered conductive when said saw-tooth wave attains a predetermined amplitude, and a normally conductive electron discharge device which is simultaneously rendered non-conductive for producing a pulse of energy for augmenting the conducting condition of the non-conductive device, both discharge devices being operatively coupled together.

10. The system of claim 5 including a frequency-limiting circuit operatively coupled to said phase control circuit and which is normally non-conductive, this frequency-limiting circuit incorporating an integrating circuit having a finite time constant and an electron discharge device coupled thereto, the conductivity of said electron discharge device being controlled by said integrating circuit such that it will be rendered conductive by said steep wave front only as determined by said integrating circuit.

11. A vibration analyzing system comprising first means for providing a signal corresponding to a mechanical vibration condition, second means operatively coupled to said first means responsive to said signal to produce a saw-tooth wave of predetermined amplitude and corresponding frequency but which is insensitive to the amplitude of said signal, said second means producing one saw-tooth wave for each cycle of said signal, third means sensitive to the amplitude of said saw-tooth wave and including an adjustable device which renders said third means sensitive to a preselected amplitude of said saw-tooth wave, said third means providing a control signal in response to said preselected amplitude, a differentiating circuit coupled to said third means and responsive to said control signal to produce a single pulse, and a stroboscope operatively coupled to said differentiating circuit and energizable by said single pulse.

12. A vibration analyzing system comprising first means for providing a signal corresponding to a mechanical vibration condition, second means operatively coupled to said first means responsive to said signal to produce a saw-tooth wave of predetermined amplitude and corresponding frequency but which is insensitive to the amplitude of said signal, said second means producing one saw-tooth wave for each cycle of said signal, third means sensitive to the amplitude of said saw-tooth wave and including an adjustable device which renders said third means sensitive to a preselected amplitude of said saw-tooth wave, said third means providing a control signal in response to said preselected amplitude, a differentiating circuit coupled to said third means and responsive to said control signal to produce a single pulse, a frequency-dividing circuit operatively coupled to said differentiating circuit and operative to produce one pulse for a predetermined number of sequentially occurring single pulses derived from said third means, and a stroboscope operatively coupled to said differentiating circuit and energizable by said one pulse.

13. A vibration analyzing system comprising first means for providing a signal corresponding to a mechanical vibration condition, circuit means operatively coupled to said first means and responsive to said signal to produce a control wave having a frequency corresponding to said signal, a frequency-dividing network operativly coupled to said circuit means and serving to produce one pulse of energy for a predetermined number of cycles of said control wave, and a stroboscope coupled to said network operatively responsive to said one pulse.

References Cited in the file of this patent

UNITED STATES PATENTS

| | | |
|---|---|---|
| 2,449,651 | Hathaway | Sept. 21, 1948 |
| 2,521,141 | Allen | Sept. 5, 1950 |
| 2,533,567 | Erickson | Dec. 12, 1950 |